United States Patent
Iji et al.

(10) Patent No.: US 6,602,938 B1
(45) Date of Patent: Aug. 5, 2003

(54) FIRE-RESISTANT POLYCARBONATE RESIN COMPOSITION

(75) Inventors: Masatoshi Iji, Tokyo (JP); Shin Serizawa, Tokyo (JP); Satoshi Umeyama, Osaka (JP); Tadashi Shinomiya, Osaka (JP); Ichiro Sato, Osaka (JP)

(73) Assignees: Sumitomo Dow Ltd., Tokyo (JP); NEC Corp., Tokyo (JP)

( * ) Notice: Subject to any disclaimer, the term of this patent is extended or adjusted under 35 U.S.C. 154(b) by 0 days.

(21) Appl. No.: 09/958,630

(22) PCT Filed: Apr. 14, 2000

(86) PCT No.: PCT/JP00/02472
§ 371 (c)(1),
(2), (4) Date: Oct. 11, 2001

(87) PCT Pub. No.: WO00/64976
PCT Pub. Date: Nov. 2, 2000

(30) Foreign Application Priority Data

Apr. 23, 1999 (JP) ............................................. 11-116560

(51) Int. Cl.$^7$ ......................... C08L 69/00; C08L 83/04; C08K 5/42
(52) U.S. Cl. ....................... 524/164; 524/158; 524/160; 524/161; 524/267; 524/268; 524/269; 525/464
(58) Field of Search ................................. 524/158, 160, 524/161, 164, 267, 268, 269; 525/464

(56) References Cited

U.S. PATENT DOCUMENTS

| 3,971,756 A | * | 7/1976 | Bialous | |
| 4,104,253 A | * | 8/1978 | Mark | |
| 4,265,801 A | | 5/1981 | Moody et al. | 260/40 |
| 4,273,691 A | | 6/1981 | MacLaury et al. | 260/23 |
| 4,379,910 A | | 4/1983 | Mark et al. | 528/202 |
| 4,387,176 A | | 6/1983 | Frye | 524/268 |
| 4,391,935 A | * | 7/1983 | Bialous | |
| 5,100,958 A | | 3/1992 | Fuhr et al. | 525/66 |
| 6,184,312 B1 | * | 2/2001 | Yamamoto | |

FOREIGN PATENT DOCUMENTS

| EP | 0 902 060 A2 | 3/1999 |
| GB | 1 516 544 | 7/1978 |
| JP | 9-151309 | 6/1997 |
| JP | 11-92678 | 4/1999 |

* cited by examiner

Primary Examiner—David J. Buttner
(74) Attorney, Agent, or Firm—Gary C Cohn PLLC

(57) ABSTRACT

This invention is a flame resistant polycarbonate resin composition characterized by blending 0.01–2 weight parts of a silicone compound (B)) wherein a main chain has a branch structure and having an aromatic group in an organic substituent, 0.01–2 weight parts of an alkali metal salt of an aromatic sulfonic acid (C) represented by the following general formula 1 (hereafter, referred to as general formula 1), and 0.05–5 weight parts of a fiber-forming fluorine-containing polymer (D), relative to 100 parts of a polycarbonate resin (A): General formula 1: $A_m\!-\!R\!-\!(SO_3M)_n$ (wherein, R is a phenyl group, naphthyl group, or a phenyl group or naphthyl group substituted by A, where A is at least one type of substituent chosen from a group comprising a halogen atom, alkyl group, aryl group, vinyl group, alkoxy group, amino group, methyl ester group and ethyl ester group, and M is an alkali metal. Also, when R is phenyl, m and n are respectively the integers 0–5 and 1–2 (m+n$\leq$6), and when R is naphthyl, m and n are respectively the integers 0–7 and 1–2 (m+n$\leq$8). The polycarbonate resin composition of this invention possesses superior flame resistance without losing shock resistance and moldability, and as it does not contain halogen fire retardants manufactured from chlorine and bromine compounds, there is no concern about generation of gases containing halogen from the fire retardant during combustion.

17 Claims, No Drawings

FIRE-RESISTANT POLYCARBONATE RESIN COMPOSITION

FIELD OF THE INVENTION

This invention relates to a fire-resistant polycarbonate resin composite. More specifically, it is related to a fire-resistant polycarbonate resin composite having improved fire retarding properties not containing halogen, i.e., chlorine and bromine, or flame-retarding agents, without impairing mechanical properties such as excellent shock resistance, fluidity and appearance of molded components which are characteristic of polycarbonate resins.

BACKGROUND OF THE INVENTION

Polycarbonate resins are widely used in many fields, such as the electrical, electronic and OA fields, as engineering plastics having excellent transparency, shock resistance, heat resisting properties and electrical properties.

In the electrical, electronic and OA fields, many components are required to have superior fire retarding properties (UL94V) and advanced shock resistance, such as personal computer exterior parts. A polycarbonate resin is a highly fire-resistant plastic having self-extinguishing properties, but in order that it may satisfy safety requirements for electrical, electronic and OA equipment, still higher fire retarding properties equivalent to UL94V-0 or 94V-1 are needed.

Thus, to improve the fire retarding properties of a polycarbonate resin, a method has conventionally been used of blending it with a large amount of an oligomer or polymer of a carbonate derivative of brominated bisphenol A. However, although the fire retarding properties of a polycarbonate resin definitely improved when it was blended with a large amount of an oligomer or polymer of a carbonate derivative of brominated bisphenol A as a flame retarder, the shock resistance fell, and cracks easily developed in molded components.

Also, as it was mixed with a large amount of a halogen compound containing bromine, there was a concern that gas containing the halogen would be generated at the time of combustion, so a flame-retarding agent not containing chlorine or bromine was desired from the environmental viewpoint. Silicone compounds have high heat resistance, do not easily generate harmful gases during combustion and are also inherently safe, so many attempts have been made to use them as flame retarders.

Silicone compounds which are flame retarders are polymers comprising at least the four siloxane units (M unit, D unit, T unit, Q unit) shown below.

(1) M unit
Structure

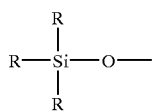

Chemical formula $R_3SiO_{0.5}$ where, R is an organic substituent.

(2) D Unit
Structure

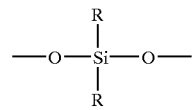

Chemical formula $R_2SiO_{1.0}$ where, R is an organic substituent.

(3) T Unit

R

Structure

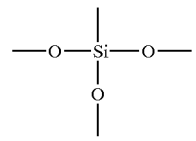

Chemical formula $RSiO1.5$ where, R is an organic substituent.

(4) Q Unit
Structure

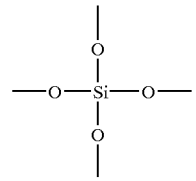

Chemical formula $RSiO2.0$

Of these, the structure will be a branched structure if it contains a T unit and/or a Q unit.

Regarding the use of silicone compounds as flame retarders, silicone compounds with various organic substituents have been studied as disclosed in JP, 1-318069 (Kokai), and JP, 62-60421 (Kokoku).

However, there are very few compounds which conferred a significant flame-retarding effect when added alone, and as a large amount had to be added to satisfy the stringent requirements of electrical and electronic equipment, it had an adverse effect on the moldability and kneadability of the plastic or other necessary characteristics. Since it was disadvantageous also from the cost viewpoint, it was also impractical.

In an attempt to improve the flame-retarding effect of the silicone compound and reduce the addition amount, the use of a silicone compound in conjunction with a metal salt has also been reported. In this regard, the combined use of polydimethyl silicone, metal hydroxide and a zinc compound (JP, 2-150436 (Kokai)), polydimethyl silicone with a group IIa metal salt of an organic acid (JP, 56-100853 (Kokai)), a silicone resin, especially as represented by an M unit and a Q unit, with a silicone oil and a group IIa metal salt of an organic acid (JP, 3-48947 (Kokoku)), may be mentioned, but all are inferior in respect of fire retarding properties. There was a fundamental problem in that drastic curtailment of the addition amount was difficult.

The combined use of an organopolysiloxane having an epoxy group (gamma-glycidoxypropyl group), phenyl group and/or vinyl group together with an alkali metal salt and alkaline earth metal salt, etc. of an organic sulfonic acid (JP, 8-176425 (Kokai)) has also been reported. However, as this silicone compound contains highly reactive epoxy groups and vinyl groups, the silicone compounds react with each other at the elevated temperature during kneading with the polycarbonate resin, causing polymerization (gelation), so that it is difficult to knead it uniformly with the polycarbonate resin. Moreover, the overall viscosity also rises, so peeling, molding sink and unevenness in the moldability of the polycarbonate resin, and particularly the surface of the molded body, occur. Further, due to this gelation, the dispersibility of the silicone compound in the polycarbonate resin is inadequate, consequently it is difficult to achieve a significant fire resistance, and there is also a problem in that strength properties, such as the impact strength of the molded product, also decrease.

DISCLOSURE OF THE INVENTION

As a result of extensive research on the aforesaid problems, the Inventors discovered that a fire-resistant polycarbonate resin composite having superior fire retarding properties could be obtained without compromising shock resistance and moldability by using a specific silicone compound and an alkali metal salt of a specific aromatic sulfonic acid, with the further addition of a fiber-forming fluorine-containing polymer, as a flame retarder blended with the polycarbonate resin.

Moreover, since the fire-resistant polycarbonate resin composite of this invention does not contain halogen flame retarders, such as a bromine flame retarder, there is also no concern regarding the generation of gas containing halogen from the halogen flame retarder during combustion, and it also has excellent performance from the viewpoint of environmental protection.

Specifically, this invention relates to a fire-resistant polycarbonate resin composite comprising 0.01–8 weight parts of a silicone compound (B) having a branch structure in the main chain and an aromatic group in the organic substituents contained therein, and 0.01–2 weight parts of an alkali metal salt of an aromatic sulfonic acid represented by the following general formula 1, relative to 100 weight parts of a polycarbonate resin (A), and further containing a fiber-forming fluorine-containing polymer (D) in the composition.

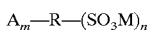

General formula 1

(where R is phenyl naphthyl, or phenyl or naphthyl substituted by A, where A is chosen from a halogen atom, alkyl group, arl group, vinyl group, alkoxy group, amino group, methyl ester group and ethyl ester group, and M is an alkali metal. Moreover, when R is a phenyl group, m and n are respectively integers of 0–5 and 1–2, (m+n≦6) and when R is a naphthyl group, m and n are respectively 0–7 and 1–2 (m+n≦8).

Below, the fire-resistant polycarbonate resin composite of this invention will be described in detail.

The polycarbonate resin (A) used for this invention is a polymer obtained by the phosgene method wherein various dihydroxydiaryl compounds and phosgene are made to react, or the ester exchange method wherein a dihydroxydiaryl compound and a carbonic acid ester such as diphenyl carbonate, are made to react, a specific example being the polycarbonate resin manufactured from 2,2-bis(4-hydroxy phenyl)propane (bisphenol A).

The above-mentioned dihydroxydiaryl compound, in addition to bisphenol A, may be a bis (hydroxyaryl) alkane such as bis(4-hydroxy phenyl)methane, 1,1-bis(4-hydroxyphenyl)ethane, 2,2-bis(4-hydroxy phenyl)butane, 2,2-bis(4-hydroxyphenyl)octane, bis(4-hydroxyphenyl) phenylmethane, 2,2-bis(4-hydroxyphenyl-3-methyl phenyl) propane, 1,1-bis (4-hydroxy-3-t-butyl phenyl)propane, 2,2-bis(4-hydroxy-3-bromophenyl)propane, 2,2-bis(4-hydroxy-3,5-dibromophenyl)propane or 2,2-bis(4-hydroxy-3,5-dichlorophenyl)propane, a bis(hydroxyaryl) cycloalkane such as 1,1-bis(4-hydroxyphenyl)cyclopentane, 1,1-bis(4-hydroxyphenyl)cyclohexane, a dihydroxydiaryl ether such as 4,4'-dihydroxydiphenylether or 4,4'-dihydroxy-3,3'-dimethyldiphenyl ether, a dihydroxydiaryl sulfide such as 4,4'-dihydroxydiphenylsulfide, a dihydroxydiaryl sulfoxide such as 4,4'-dihydroxydiphenylsulfoxide or 4,4'-dihydroxy-3,3'-dimethyl diphenylsulfoxide, or a dihydroxydiaryl sulfone such as 4,4'-dihydroxydiphenylsulfone or 4,4'-dihydroxy-3,3'-dimethyl diphenylsulfone.

These are used separately, or two or more may be used in combination. From the viewpoint of preventing discharge of gases containing halogen into the environment during combustion, it is preferable to use a compound unsubstituted by halogen. In addition, mixtures of piperazine, dipiperidyl hydroquinone, resorcinol or 4,4'-dihydroxydiphenyl etc., may also be used.

Further, the aforesaid dihydroxyaryl compound can also be used mixed with phenol compounds having a valency of three or more, as indicated below.

Examples of phenols having a valency of three or more are phloroglucine, 4,6-dimethyl, 2,4,6-tri(4-hydroxyphenyl)-heptene, 2,4,6-dimethyl-2,4,6-tri(4-hydroxyphenyl)-heptane, 1,3,5-tri(4-hydroxy phenyl)-benzole, 1,1,1-tri(4-hydroxyphenyl)-ethane and 2,2-bis-[4, 4,-(4 4'-dihydroxydiphenyl)-cyclohexyl]-propane.

The viscosity average molecular weight of the polycarbonate resin (A) is usually 10000–100000, but preferably 15000–35000. When this polycarbonate resin is manufactured, a molecular weight modifier, catalyst, etc. can be used if needed.

As the silicone compound (B) used in this invention, a compound wherein the main chain has a branched structure and containing an aromatic group as an organic substituent, such as shown in the following general formula 2, may be used.

General formula 2

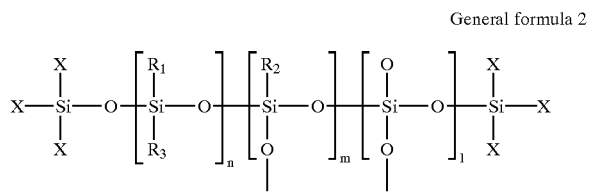

Herein, $R_1$, $R_2$, $R_3$ represent organic substituents in the main chain, X represents a terminal substituent group, and n, m, l represent the number of moles of each unit.

The branch units are characterized by having a T unit and/or a Q unit. It is desirable that these contain at least 20 mol % of all the siloxane units of the whole. If it is less than 20 mol %, the heat resistance of the silicone compound (B) decreases and its fire resistance decreases, also, the viscosity of the silicone compound (B) itself is too low, and may have an adverse influence on kneading and moldability with the polycarbonate resin (A). It is still more desirable that the proportion is 30–95 mol %. If it is more than 30 mol %, the heat resistance of the silicone compound (B) further increases, and the fire retarding properties of the polycarbonate resin containing this considerably improve.

However, if 95 mol % is exceeded, the degree of freedom of the main silicone chain decreases so it may be difficult to cause condensation of aromatic rings during combustion, and may be difficult to achieve significant fire retarding properties.

Also, in the silicone compound (B), it is desirable that the organic substituents contain at least 20 mol % of aromatic groups. Below this range, condensation of aromatic groups may not occur easily during combustion, and the fire resistance may decrease. It is still more preferable that the proportion is less than 40–95 mol %. If it is more than 40 mol %, the aromatic groups can condense much more efficiently, the dispersibility of the silicone compound (B) in the polycarbonate resin (A) considerably improves, and very good fire resistance is achieved. However, if 95 mol % is exceeded, due to the steric hindrance of aromatic groups, it may be difficult to produce such condensation, and difficult to achieve considerable fire resistance.

This aromatic group may be phenyl, biphenyl, naphthalene or derivatives thereof, but from the aspect of safety to health of the silicone compound (B), phenyl groups are particularly desirable. Regarding the organic substituents in this silicone compound (B), of those groups attached to the main chain or branched side chain, the organic groups other than aromatic groups are preferably methyl, and the terminal group may be one, or a mixture of from two to four of methyl, phenyl, hydroxyl and alkoxy (particularly, methoxy). As reactivity is low in the case of these terminal groups, gelation (crosslinking) does not easily occur during kneading of the polycarbonate resin (A) and silicone compound (B), hence the silicone compound (B) can disperse uniformly in the polycarbonate resin (A), consequently it can have much better fire resistance, and moldability also further improves. Methyl groups are especially preferred. In this case, reactivity is extremely low, so dispersibility becomes very good, and fire retarding properties can be further improved.

The average molecular weight (weight average) of the silicone compound (B) is preferably 5000–500000. If it is less than 5000, the heat resistance of the silicone compound itself will decrease, the fire resistance will decrease, the melt viscosity will decrease too much so that the silicone compound oozes out on the surface of the polycarbonate resin (A) during molding, and moldability may be reduced. Conversely, if 500000 is exceeded, melt viscosity increases, uniform dispersion in the polycarbonate resin (A) is lost, and fire resistance and moldability may decrease. It is particularly preferable that the molecular weight is 10000–270000. In this range, as the melt viscosity of the silicone compound (B) is optimal, the silicone compound (B) can disperse very uniformly in the polycarbonate resin (A), and as there is no excessive staining of the surface, still better fire retarding properties and moldability can be attained.

The blending amount of the silicone compound (B) is preferably 0.01–8 weight parts per 100 weight parts of polycarbonate (resin A). If the blending amount is less than 0.01 weight parts, fire resistance may be inadequate, and if it exceeds 8 weight parts, surface layer peeling may occur on the surface of the molded components, and the appearance may suffer. The blending amount is more preferably in the range of 0.1–5 weight parts, and still more preferably 0.5–2 weight parts. In this range, the balance of fire retarding properties, moldability and impact resistance is even better.

The alkali metal salt (C) of the aromatic sulfonic acid used by this invention may be represented by the following general formula 1.

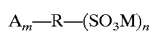  General formula 1

(where R is phenyl, naphthyl, or phenyl or naphthyl substituted by A, where A is chosen from a halogen atom, alkyl group, aryl group, vinyl group, alkoxy group, amino group, methyl ester group or ethyl ester group, and M is an alkali metal. Moreover, when R is a phenyl group, m and n are respectively integers of 0–5 and 1–2, (m+n$\leq$6) and when R is a naphthyl group, m and n are respectively 0–7 and 1–2 (m+n$\leq$8).

As the alkali metal salt of the aromatic sulfonic acid which satisfies the general formula 1, for example, alkali metal salts such as p-toluenesulfonic acid, p-styrene sulfonic acid, 1-naphthalene sulfonic acid, Isophthalic acid dimethyl-5-sulfonic acid, 2,6-naphthalene disulfonic acid, benzenesulfonic acid, benzene disulfonic acid, 2 4,6-trichloro-5-sulfoisophthalic acid dimethyl, 2,5-dichlorobenzene sulfonic acid, 2 4,5-trichlorobenzene sulfonic acid, p-iodobenzene sulfonic acid and 7-amino-1,3-naphthalene disulfonic acid, may be mentioned. These can be used separately, or more than one may be used in combination. Of these, one, two or more sodium salts and/or potassium salts chosen from 2,4,6-trichloro-5-sulfoisophthalic acid dimethyl, 2,5-dichlorobenzene sulfonic acid, 2 4,5-trichlorobenzene sulfonic acid; or one, two or more salts chosen from p-toluenesulfonic acid, p-styrene sulfonic acid, 1-naphthalene sulfonic acid, isophthalic acid dimethyl-5-sulfonic acid, 2,6-naphthalene disulfonic acid, benzenesulfonic acid and benzene disulfonic acid may conveniently be used.

Moreover, it is preferable that the sodium salt of p-toluenesulfonic acid, p-styrene sulfonic acid, 1-naphthalene sulfonic acid, isophthalic acid dimethyl-5-sulfonic acid, 2,6-naphthalene disulfonic acid, benzenesulfonic acid and benzene disulfonic acid is adjusted so that the amount of sodium shown in the following Equation 1 is 0.001–0.05 weight parts relative to 100 weight parts of the polycarbonate (resin A).

Amount of sodium (weight parts)=blending amount (weight parts) of sodium salt of aromatic sulfonic acid per 100 weight parts of polycarbonate (resin A)×sodium molar fraction in the following Equation 2.   Equation 1:

Sodium molar fraction=atomic weight of sodium/molecular weight of sodium salt of aromatic sulfonic acid   Equation 2:

In the calculation of the sodium molar fraction shown in Equation 2, the atomic weight of each element is computed based on the atomic weight table (1995) of The International Union of Pure and Applied Chemistry (IUPAC). For example, for hydrogen it is 1.0080, and for carbon, oxygen, nitrogen, sulfur and sodium, it is 12.0107, 15.9994, 14.0067, 32.0666 and 22.9898, respectively. When the sodium amount is less than 0.001 weight parts, the proportion of sodium contained in the polycarbonate resin (A) is too low, so flame-retarding properties may decrease. On the other hand, when the sodium amount exceeds 0.05 weight parts, flame-retarding properties may again decrease. The preferred range is 0.002–0.04 weight parts.

The blending amount of the alkali metal salt (C) of the aromatic sulfonic acid shown in the general formula 1 is 0.01–2 weight parts to 100 weight parts of the polycarbonate resin (A). If it less than 0.01 weight parts, fire retarding properties decrease, and if it is more than 2 weight parts, thermal stability decreases during extrusion molding which is undesirable. The preferred range is 0.01–1 weight parts, but more preferably 0.02–0.4 weight parts.

The fire-resistant polycarbonate resin composite of this invention may be mixed with other well-known flame retarders, for example halogen flame retarders, other silicone flame retarders or phosphorus flame retarders, etc. if needed. Examples of halogen flame retarders are brominated bisphenol A and polybromo-substituted aromatics homolog, examples of other silicone flame retarders are polyorganosiloxanes and polycarbonate-polyorganosiloxane copolymers, and examples of phosphorus flame retarders are phosphoric acid esters.

The fiber-forming fluorine-containing polymer (D) used by this invention may form a fiber structure (fibril-like structure) in the polycarbonate resin (A), examples being polytetrafluoroethylene, tetrafluoroethylene copolymers (for example, tetrafluoroethylene/hexa fluoropropylene copolymers), partially fluorinated polymers as shown in U.S. Pat. No. 4,379,910, and polycarbonates manufactured from fluorinated diphenols. When these are used together with a combination of the silicone compound (B) of this invention and the aromatic sulfonic acid alkali metal salt (C), in addition to preventing the dripping of the prior art, there is also a specific effect in preventing reduction of combustion time. The blending amount of the fiber-forming fluorine-containing polymer (D) is 0.05–5 weight parts to 100 weight parts of the polycarbonate resin (A): If the blending amount is less than 0.05 weight parts, there is less dripping prevention effect, and if it is more than 5 weight parts, granulation becomes difficult which interferes with stable production.

The preferred range is 0.05–1 weight parts, but more preferably 0.1–0.5 weight parts. In this range, the balance of fire retarding properties, moldability and impact strength is even better.

Additives, such as various kinds of thermostabilizers, antioxidants, colorants, optical whitening agents, fillers, release agents, softeners, and antistatic agents, impact improving materials and other polymers may be blended with the polycarbonate resin (A) to the extent that they do not impair the effectiveness of this invention.

Examples of thermostabilizers are metal bisulfates such as sodium hydrogen sulfate, potassium hydrogen sulfate and lithium hydrogen sulfate, and metal sulfates such as aluminium sulfate. These are usually used in the range of 0–0.5 weight parts to 100 weight parts of the polycarbonate resin (A). Examples of fillers are glass fiber, glass beads, glass flakes, carbon fiber, talc powder, clay powder, mica, potassium titanate whisker, wollastonite powder and silica powder.

Examples of impact-improving materials are acrylic elastomers, polyester elastomers, core shell methyl methacrylate/butadiene/styrene copolymer, methyl methacrylate/acrylonitrile/styrene copolymer, ethylene/propylene rubber and ethylene/propylene/diene rubber.

Examples of other polymers are polyesters such as for example polyethylene terephthalate and polybutylene terephthalate; styrene polymers such as polystyrene, high impact polystyrene, acrylonitrile styrene copolymer and acrylic rubber-modified compounds of same, acrylonitrile/butadiene/styrene copolymer, acrylonitrile/ethylene/propylene/diene/rubber (EPDM)/styrene copolymer; polypropylene, and polymers usually used in the alloy of polycarbonate resins.

There is no particular limitation on the method of blending the various components in the fire-resistant polycarbonate resin composite of this invention, examples being well-known mixers such as a tumbler or ribbon blender, or melt kneading by an extruder.

There is no particular limitation on the method of forming the fire-resistant polycarbonate resin composite of this invention, it being possible to use the well-known injection molding method or injection stamping method.

DESCRIPTION OF THE EXAMPLES

This invention will now be described by way of examples, but this invention is not limited to these examples. "Part" is based on weight parts.

EXAMPLES 1–68 AND COMPARATIVE EXAMPLES 1–33

Composites were melt extruded, at a cylinder temperature of 280 degree C. using a twin bis extruder (Kobe steel KTX-37) of diameter 37 mm based on the blending amounts shown in Tables 3–17 relative to 100 parts of the polycarbonate resin part manufactured from bisphenol A, to obtain various pellets.

The details of the raw materials used were respectively as follows.

1. Polycarbonate Resin (A)

Caliber 200–20 (viscosity average molecular weight 19000), Sumitomo Dow Co.

2. Silicone Compound (B):

The silicone compound (B) was manufactured according to the ordinary manufacturing method. Specifically, a diorganodichlorosilane, monoorganotrichlorosilane and tetrachlorosilane, or partial hydrolysis condensates thereof, were dissolved in an organic solvent according to the molecular weight of the silicone compound and the proportion of M units, D units, T units and Q units comprising the silicone compound, and water was added to hydrolyze the mixture so as to form a partially condensed silicone compound. Triorganochlorosilane was then added and reacted to terminate the polymerization, and the solvent was separated by distillation or the like. The structural characteristics of 19 types of silicone compounds synthesized by the aforesaid method are shown in Table 1.

TABLE 1

| Silicone | D/T/Q ratio in main chain (mol ratio) | percentage of phenyl group* in organic substituent (mol %) | terminal group and its percentage (mol ratio) | weight average molecular weight** |
|---|---|---|---|---|
| a | 0.7/9.3/0 | 60 | solely methyl | 12,000 |
| b | 2/8/0 | 60 | solely methyl | 7,000 |
| c | 2/8/0 | 60 | solely methyl | 12,000 |
| d | 2/8/0 | 60 | solely methyl | 70,000 |
| e | 2/8/0 | 60 | solely methyl | 250,000 |
| f | 2/8/0 | 60 | solely methyl | 300,000 |
| g | 2/8/0 | 60 | solely hydroxyl | 250,000 |
| h | 5/5/0 | 40 | methyl | 80,000 |
| i | 6.5/3.5/0 | 50 | solely methyl | 50,000 |
| j | 6.5/1.5/2 | 50 | solely methyl | 50,000 |
| k | 6.5/3.5/0 | 50 | metyl/methoxy = 1/1 | 50,000 |
| l | 7.5/2.5/0 | 50 | solely methyl | 50,000 |
| m | 9/1/0 | 50 | solely methyl | 50,000 |
| n | 10/0/0 | 50 | solely methyl | 50,000 |
| o | 2/8/0 | 90 | solely phenyl | 70,000 |
| p | 2/8/0 | 45 | solely methyl | 70,000 |
| q | 2/8/0 | 25 | solely methyl | 70,000 |
| r | 2/8/0 | 10 | solely methyl | 70,000 |
| s | 2/8/0 | 0 | solely methyl | 70,000 |

Notes:
*Phenyl groups are first contained in T units in a silicone comprising T units, and any remaining are in D units. If a phenyl group is attached to a D unit, compounds where one is attached have priority, two being attached if there are any remaining. Excepting for terminal groups, all organic substituents are methyl.
**the weight average molecular weight is given to two significant figures.

3. Alkali Metal Salt of Aromatic Sulfonic Acid (C)

TABLE 2

| symbol | alkali metal salt of aromatic sulfonic acid (C) |
|---|---|
| C-1 | 2,5-dichlorobenzene sodium sulfonate |
| C-2 | 2,4,5-trichlorobenzene sodium sulfonate |
| C-3 | sodium salt of 2,4,6-tricholoro-5-sulfo isophthalic acid dimethyl |
| C-4 | p-toluenesulfonic acid sodium |
| C-5 | 1-naphthalenesulfonic acid sodium |
| C-6 | p-sodium styrenesulfonate |
| C-7 | isophthalic acid dimethyl-5-sodium sulfonate |
| C-8 | sodium benzenesulfonate |
| C-9 | 1-naphthalenesulfonic acid sodium |
| C-10 | m-benzene sodium disulfonate |

4. Fiber-forming Fluorine-containing Polymer (D);
Polytetrafluoroethylene (polychlorofluoron FA-500, Daikin Industries (abbreviated hereafter as PTFE).

6. Carbonate/oligomer of Tetrabromobisphenol A:
BC-52, Great Lakes Chemicals (abbreviated as Br oligomer)

After drying the various pellets obtained at 125 degrees C. for 4 hours, a test piece for fire-resistance evaluation (125× 13×1.6 mm and 125×13×3.2 mm) was formed at 280 degrees C. and an injection pressure of 1600 kg/cm$^2$ in an injection molding machine (J100-E-C5, Japan Steel Co.).

This test piece was left in a constant temperature room at a temperature of 23 degrees C. and 50% humidity for 48 hours, and a fire-resistance evaluation was performed based on the UL94 test (flammability test for plastics for equipment components) defined by Underwriters Laboratories. In UL94V, fire retarding properties are evaluated from the remaining flame time and drip characteristics after bringing the flame of a burner in contact with a specimen of predetermined size held perpendicularly for 10 seconds, and is divided into the following classes.

|  | V-0 | V-1 | V-2 |
|---|---|---|---|
| Remaining flame time for each sample | 10 seconds or less | 30 seconds or less | 30 seconds or less |
| Total remaining flame time of five samples | 50 seconds or less | 250 seconds or less | 250 seconds or less |
| Ignition of cotton by drip | No | No | Yes |

The remaining flame time shown above is the length of time for which the specimen continues to burn with a flame after removing it from the ignition source, and ignition of cotton by drip is determined by whether or not a standard piece of cotton approximately 300 mm under the lower end of the test piece is ignited by the drip from the test piece. If any of the five samples did not satisfy even one of the above criteria, it was evaluated as NR (not rated) for not satisfying V-2. The results are shown in Tables 3–17.

Using the various pellets obtained, injection molding was similarly performed to manufacture a test piece (3.2×2.7× 63.5 mm) for impact strength evaluation. Using this test piece, the impact strength with a notch was measured according to ASTM D-256. Also, as to the appearance of the molded component, a test piece was visually inspected before impact strength measurement, and the surface was examined for surface peeling or molding sink.

The results are shown in Tables 3–17, respectively.
In Tables 3–17:
Numerical values for silicone, metal salt and PTFE are addition amounts (parts) relative to 100 parts of polycarbonate resin.

The sodium amount shows the number of parts calculated by the following equation 1.

sodium amount (parts)=blending amount of aromatic sulfonic acid per 100 parts of polycarbonate resin (A)×sodium molar fraction from the following Equation 2   Equation 1:

sodium molar fraction =atomic weight of sodium/ molecular weight of sodium salt of aromatic sulfonic acid   Equation 2:

In the evaluation results for flame-retarding properties in the table, the values ( ) show the total (seconds) for the remaining flame time (combustion time after ignition) of the five samples. The values [ ] in the table show the number (number of the five samples) for which a standard piece of cotton ignited due to drip.

moldability was evaluated from peeling of the surface layer, or unevenness or surface sink of the molded test piece, as follows.

○: did not occur.

Δ: occurred in one to two of the five samples.

X: occurred in three or more of the five samples.

TABLE 3

|  | Examples | | | | | | |
|---|---|---|---|---|---|---|---|
|  | 1 | 2 | 3 | 4 | 5 | 6 | 7 |
| silicone a | 2 | — | — | — | — | — | — |
| silicone b | — | 2 | — | — | — | — | — |
| silicone c | — | — | 2 | — | — | — | — |
| silicone d | — | — | — | 4 | 4 | 4 | 4 |
| metal salt C-1 | 0.1 | 0.1 | 0.1 | 0.02 | 0.1 | 1.0 | 1.5 |
| PTFE | 0.3 | 0.3 | 0.3 | — | — | — | — |
| flame-retarding properties UL94 | | | | | | | |
| 3.2 mm thick | V-0 (27) | V-0 (25) | V-0 (21) | V-0 (45) | V-0 (27) | V-0 (30) | V-1 (62) |
| 1.6 mm thick | V-0 (35) | V-0 (36) | V-0 (27) | V-1 (62) | V-0 (35) | V-0 (40) | V-1 (88) |
| moldability | ○ | Δ | ○ | ○ | ○ | ○ | Δ |
| notched impact strength (Kgcm/cm) | 63 | 60 | 61 | 62 | 61 | 62 | 59 |

TABLE 4

|  | Examples | | | | | | |
|---|---|---|---|---|---|---|---|
|  | 8 | 9 | 10 | 11 | 12 | 13 | 14 |
| silicone d | 4 | 1 | 1 | 1 | — | — | — |
| silicone e | — | — | — | — | 0.5 | 4 | 7 |
| metal salt C-1 | 0.1 | 0.02 | 0.6 | 1.2 | 0.1 | 0.1 | 0.1 |
| PTFE | 0.2 | 0.2 | 0.2 | 0.2 | — | — | — |
| flame-retarding properties UL94 | | | | | | | |
| 3.2 mm thick | V-0 (20) | V-0 (32) | V-0 (22) | V-0 (38) | V-0 (30) | V-0 (25) | V-0 (41) |
| 1.6 mm thick | V-0 (24) | V-0 (45) | V-0 (30) | V-1 (55) | V-0 (37) | V-0 (33) | V-0 (49) |
| moldability | ○ | ○ | ○ | ○ | ○ | ○ | ○ |
| notched impact strength (Kgcm/cm) | 62 | 63 | 64 | 60 | 63 | 60 | 61 |

TABLE 5

| | Examples | | | | | | |
|---|---|---|---|---|---|---|---|
| | 15 | 16 | 17 | 18 | 19 | 20 | 21 |
| silicone e | 0.02 | 0.5 | 4 | 7 | — | — | — |
| silicone f | — | — | — | — | 4 | — | — |
| silicone g | — | — | — | — | — | 4 | 4 |
| metal salt C-1 | 0.1 | 0.1 | 0.1 | 0.1 | 0.1 | 0.1 | 0.1 |
| PTFE | 0.3 | 0.3 | 0.3 | 0.3 | 0.3 | — | 0.3 |
| flame-retarding properties UL94 | | | | | | | |
| 3.2 mm thick | V-1 (75) | V-0 (15) | V-0 (13) | V-0 (27) | V-0 (24) | V-0 (31) | V-0 (17) |
| 1.6 mm thick | V-1 (98) | V-0 (20) | V-0 (16) | V-0 (40) | V-0 (33) | V-0 (45) | V-0 (27) |
| moldability | ○ | ○ | ○ | ○ | Δ | ○ | ○ |
| notched impact strength (Kgcm/cm) | 55 | 61 | 62 | 62 | 62 | 63 | 64 |

TABLE 6

| | Examples | | | | | | |
|---|---|---|---|---|---|---|---|
| | 22 | 23 | 24 | 25 | 26 | 27 | 28 |
| silicone h | 2 | 2 | 2 | 2 | 2 | 2 | 2 |
| metal salt C-1 | 0.1 | 0.1 | 0.1 | 0.1 | 0.1 | 0.1 | 0.1 |
| PTFE | — | 0.06 | 0.1 | 0.3 | 0.5 | 1 | 4 |
| flame-retarding properties UL94 | | | | | | | |
| 3.2 mm thick | V-0 (38) | V-0 (28) | V-0 (18) | V-1 (17) | V-0 (16) | V-0 (30) | V-0 (34) |
| 1.6 mm thick | V-1 (54) | V-0 (39) | V-0 (28) | V-1 (28) | V-0 (27) | V-0 (38) | V-0 (49) |
| moldability | ○ | ○ | ○ | ○ | ○ | ○ | ○ |
| notched impact strength (Kgcm/cm) | 63 | 60 | 61 | 60 | 61 | 62 | 60 |

TABLE 7

| | Examples | | | | | | | |
|---|---|---|---|---|---|---|---|---|
| | 29 | 30 | 31 | 32 | 33 | 34 | 35 | 36 |
| silicone i | 2 | 2 | — | — | — | — | — | — |
| silicone j | — | — | 2 | — | — | — | — | — |
| silicone k | — | — | — | 2 | — | — | — | — |
| silicone l | — | — | — | — | 2 | 2 | — | — |
| silicone m | — | — | — | — | — | — | 2 | 2 |
| metal salt C-1 | 0.1 | 0.1 | 0.1 | 0.1 | 0.1 | 0.1 | 0.1 | 0.1 |
| PTFE | — | 0.3 | 0.3 | 0.3 | — | 0.3 | — | 0.3 |
| flame-retarding properties UL94 | | | | | | | | |
| 3.2 mm thick | V-0 (31) | V-0 (20) | V-0 (17) | V-0 (28) | V-0 (48) | V-0 (33) | V-1 (60) | V-1 (53) |
| 1.6 mm thick | V-0 (49) | V-0 (30) | V-0 (26) | V-0 (41) | V-1 (73) | V-0 (49) | V-2 [1] | V-1 (83) |
| moldability | ○ | ○ | ○ | ○ | ○ | ○ | Δ | Δ |
| notched impact strength (Kgcm/cm) | 62 | 62 | 63 | 62 | 60 | 60 | 57 | 58 |

TABLE 8

| | Examples | | | | | | | |
|---|---|---|---|---|---|---|---|---|
| | 37 | 38 | 39 | 40 | 41 | 42 | 43 | 44 |
| silicone o | 2 | 2 | — | — | — | — | — | — |
| silicone p | — | — | 2 | 2 | — | — | — | — |
| silicone q | — | — | — | — | 2 | 2 | — | — |
| silicone r | — | — | — | — | — | — | 2 | 2 |
| metal salt C-1 | 0.1 | 0.1 | 0.1 | 0.1 | 0.1 | 0.1 | 0.1 | 0.1 |
| PTFE | — | 0.3 | — | 0.3 | — | 0.3 | — | 0.3 |
| flame-retarding properties UL94 | | | | | | | | |
| 3.2 mm thick | V-0 (30) | V-0 (20) | V-0 (30) | V-0 (14) | V-0 (45) | V-0 (31) | V-1 (60) | V-1 (56) |
| 1.6 mm thick | V-0 (42) | V-0 (33) | V-0 (45) | V-0 (23) | V-1 (66) | V-0 (44) | V-2 [1] | V-1 (78) |
| moldability | ○ | ○ | ○ | ○ | ○ | ○ | Δ | Δ |
| notched impact strength (Kgcm/cm) | 62 | 62 | 63 | 62 | 60 | 60 | 57 | 58 |

TABLE 9

| | Examples | | | | | |
|---|---|---|---|---|---|---|
| | 45 | 46 | 47 | 48 | 49 | 50 |
| silicone d | 1 | 1 | 1 | — | — | — |
| silicone h | — | — | — | 2 | 2 | 2 |
| metal salt C-1 | 0.1 | — | — | 0.1 | — | — |
| metal salt C-2 | — | 0.1 | — | — | 0.1 | — |
| metal salt C-3 | — | — | 0.1 | — | — | 0.1 |
| PTFE | 0.3 | 0.3 | 0.3 | 0.2 | 0.2 | 0.2 |
| flame-retarding properties UL94 | | | | | | |
| 3.2 mm thick | V-0 (8) | V-0 (7) | V-0 (18) | V-0 (17) | V-0 (16) | V-0 (27) |
| 1.6 mm thick | V-0 (10) | V-0 (10) | V-0 (26) | V-0 (20) | V-0 (19) | V-0 (34) |
| moldability | ○ | ○ | ○ | ○ | ○ | ○ |
| notched impact strength (Kgcm/cm) | 64 | 64 | 63 | 63 | 63 | 64 |

TABLE 10

| | Examples | | | | | |
|---|---|---|---|---|---|---|
| | 51 | 52 | 53 | 54 | 55 | 56 |
| silicone d | 1 | 1 | 1 | 1 | 1 | 1 |
| metal salt C-4 | 0.05 | 0.05 | 0.01 | 0.01 | 0.4 | 0.4 |
| amount of Na | 0.0059 | 0.0059 | 0.00118 | 0.00118 | 0.0472 | 0.0472 |
| PTFE | 0.3 | — | 0.3 | — | 0.3 | — |
| flame-retarding properties UL94 | | | | | | |
| 3.2 mm thick | V-0 (10) | V-0 (18) | V-0 (26) | V-0 (42) | V-0 (25) | V-0 (40) |
| 1.6 mm thick | V-0 (12) | V-0 (24) | V-1 (35) | V-0 (58) | V-0 (33) | V-1 (55) |
| mold-ability | ○ | ○ | ○ | ○ | ○ | ○ |

TABLE 10-continued

| | Examples | | | | | |
|---|---|---|---|---|---|---|
| | 51 | 52 | 53 | 54 | 55 | 56 |
| notched impact strength (Kgcm/cm) | 64 | 60 | 65 | 62 | 61 | 60 |

TALBE 11

| | Examples | | | | | |
|---|---|---|---|---|---|---|
| | 57 | 58 | 59 | 60 | 61 | 62 |
| silicone d | 1 | 1 | 1 | 1 | 1 | 1 |
| metal salt C-5 | 0.05 | 0.05 | — | — | — | — |
| metal salt C-6 | — | — | 0.05 | 0.05 | — | — |
| metal salt C-7 | — | — | — | — | 0.05 | 0.05 |
| amount of Na | 0.005 | 0.005 | 0.0056 | 0.0056 | 0.0039 | 0.0039 |
| PTFE | 0.3 | — | 0.3 | — | 0.3 | — |
| flame-retarding properties UL94 | | | | | | |
| 3.2 mm thick | V-0 (12) | V-0 (21) | V-0 (10) | V-0 (19) | V-0 (18) | V-0 (30) |
| 1.6 mm thick | V-0 (16) | V-0 (29) | V-0 (14) | V-0 (27) | V-0 (23) | V-0 (40) |
| moldability | ○ | ○ | ○ | ○ | ○ | ○ |
| notched impact strength (Kgcm/cm) | 63 | 61 | 63 | 61 | 61 | 62 |

TABLE 12

| | Examples | | | | | |
|---|---|---|---|---|---|---|
| | 63 | 64 | 65 | 66 | 67 | 68 |
| silicone d | 1 | 1 | 1 | 1 | 1 | 1 |
| metal salt C-8 | 0.05 | 0.05 | — | — | — | — |
| metal salt C-9 | — | — | 0.05 | 0.05 | — | — |
| metal salt C-10 | — | — | — | — | 0.05 | 0.05 |
| amount of Na | 0.0064 | 0.0064 | 0.0069 | 0.0069 | 0.00815 | 0.00815 |
| PTFE | 0.3 | — | 0.3 | — | 0.3 | — |
| flame-retarding properties UL94 | | | | | | |
| 3.2 mm thick | V-0 (11) | V-0 (21) | V-0 (10) | V-0 (20) | V-0 (10) | V-0 (19) |
| 1.6 mm thick | V-0 (16) | V-0 (28) | V-0 (16) | V-0 (27) | V-0 (15) | V-0 (26) |
| moldability | ○ | ○ | ○ | ○ | ○ | ○ |

TABLE 12-continued

| | Examples | | | | | |
|---|---|---|---|---|---|---|
| | 63 | 64 | 65 | 66 | 67 | 68 |
| notched impact strength (Kgcm/cm) | 63 | 64 | 64 | 63 | 63 | 63 |

TABLE 13

| | Comparative examples | | | | |
|---|---|---|---|---|---|
| | 1 | 2 | 3 | 4 | 5 |
| Br oligomer | — | — | — | — | 5 |
| silicone | — | — | — | — | — |
| metal salt C-1 | — | 0.1 | — | 0.1 | — |
| PTFE | — | — | 0.3 | 0.3 | 0.3 |
| flame-retarding properties UL94 | | | | | |
| 3.2 mm thick | V-2 [5] | V-2 [5] | V-1 (162) | V-1 (150) | V-1 (35) |
| 1.6 mm thick | V-2 [5] | V-2 [5] | V-2 [2] | V-2 [2] | V-1 (44) |
| moldability | ○ | ○ | ○ | ○ | ○ |
| notched impact strength (Kgcm/cm) | 67 | 61 | 40 | 41 | 27 |

TABLE 14

| | Comparative examples | | | | | | |
|---|---|---|---|---|---|---|---|
| | 6 | 7 | 8 | 9 | 10 | 11 | 12 |
| silicone d | 1 | 1 | 1 | — | — | — | — |
| silicone e | — | — | — | 0.005 | 0.005 | 10 | 10 |
| metal salt C-1 | 0.008 | 3 | 3 | 0.1 | 0.1 | 0.1 | 0.1 |
| PTFE | 0.2 | 0.2 | — | — | 0.3 | — | 0.3 |
| flame-retarding properties UL94 | | | | | | | |
| 3.2 mm thick | V-1 (84) | V-1 (98) | V-1 (125) | V-1 (131) | V-1 (106) | V-0 (44) | V-0 (37) |
| 1.6 mm thick | V-1 (110) | V-1 (115) | V-1 (133) | V-2 [5] | V-2 [2] | V-1 (61) | V-0 (47) |
| moldability | ○ | Δ | Δ | ○ | ○ | x | x |
| notched impact strength (Kgcm/cm) | 65 | 43 | 48 | 63 | 40 | 61 | 62 |

TABLE 15

| | Comparative examples | | | | | |
|---|---|---|---|---|---|---|
| | 13 | 14 | 15 | 16 | 17 | 18 |
| silicone h | 2 | — | — | — | — | — |
| silicone i | — | 2 | — | — | — | — |
| silicone k | — | — | 2 | — | — | — |
| silicone n | — | — | — | 2 | 2 | 2 |
| metal salt C-1 | — | — | — | — | 0.1 | 0.1 |
| PTFE | — | — | — | — | — | 0.3 |

TABLE 15-continued

| | Comparative examples | | | | | |
|---|---|---|---|---|---|---|
| | 13 | 14 | 15 | 16 | 17 | 18 |
| flame-retarding properties UL94 | | | | | | |
| 3.2 mm thick | V-1 (82) | V-1 (83) | V-1 (92) | V-2 [4] | V-1 (130) | V-1 (115) |
| 1.6 mm thick | V-2 [2] | V-2 [2] | V-2 [3] | V-2 [5] | V-2 [5] | V-2 [3] |
| moldability | ○ | ○ | ○ | x | x | x |
| notched impact strength (Kgcm/cm) | 63 | 62 | 62 | 46 | 45 | 45 |

TABLE 16

| | Comparative examples | | | | | | | |
|---|---|---|---|---|---|---|---|---|
| | 19 | 20 | 21 | 22 | 23 | 24 | 25 | 26 |
| silicone o | 2 | — | — | — | — | — | — | — |
| silicone p | — | 2 | — | — | — | — | — | — |
| silicone q | — | — | 2 | — | — | — | — | — |
| silicone r | — | — | — | 2 | — | — | — | — |
| silicone s | — | — | — | — | 2 | 2 | 2 | 2 |
| metal salt C-1 | — | — | — | — | — | 0.1 | 0.1 | 0.3 |
| PTFE | — | — | — | — | — | — | 0.3 | 0.3 |
| flame-retarding properties UL94 | | | | | | | | |
| 3.2 mm thick | V-1 (97) | V-1 (80) | V-1 (89) | V-1 (121) | V-2 [4] | V-2 [4] | V-1 (136) | V-1 (122) |
| 1.6 mm thick | V-2 [3] | V-2 [2] | V-2 [3] | V-2 [4] | V-2 [5] | V-2 [5] | V-2 [3] | V-2 [3] |
| moldability | ○ | ○ | Δ | Δ | x | x | x | x |
| notched impact strength (Kgcm/cm) | 63 | 63 | 61 | 53 | 45 | 46 | 45 | 41 |

TABLE 17

| | Comparative examples | | | | | | |
|---|---|---|---|---|---|---|---|
| | 27 | 28 | 29 | 30 | 31 | 32 | 33 |
| silicone d | 1 | 1 | 1 | 1 | 1 | 1 | 1 |
| metal salt C-4 | 0.005 | — | — | — | — | — | — |
| metal salt C-5 | — | 0.005 | — | — | — | — | — |
| metal salt C-6 | — | — | 0.005 | — | — | — | — |
| metal salt C-7 | — | — | — | 0.005 | — | — | — |
| metal salt C-8 | — | — | — | — | 0.005 | — | — |
| metal salt C-9 | — | — | — | — | — | 0.005 | — |
| metal salt C-10 | — | — | — | — | — | — | 0.005 |
| amount of Na (×0.001) | 0.59 | 0.50 | 0.56 | 0.39 | 0.64 | 0.33 | 0.815 |
| PTFE | 0.2 | 0.2 | 0.2 | 0.2 | 0.2 | 0.2 | 0.2 |
| flame-retarding properties UL94 | | | | | | | |
| 3.2 mm thick | V-1 (118) | V-1 (122) | V-1 (121) | V-1 (128) | V-1 (109) | V-1 (131) | V-1 (101) |
| 1.6 mm thick | V-1 (132) | V-1 (140) | V-1 (135) | V-1 (150) | V-1 (133) | V-1 (158) | V-1 (130) |
| moldability | ○ | ○ | ○ | ○ | ○ | ○ | ○ |
| notched impact strength (Kgcm/cm) | 64 | 64 | 64 | 65 | 63 | 65 | 64 |

As shown in Examples 1–68, the polycarbonate resin composition characterized in that 0.01–8 parts of a silicone compound having a main chain with a branch structure and aromatic groups (B) and 0.01–2 parts of an alkali metal salt (C) of the aromatic sulfonic acid shown by the general formula 1 are added, or a polycarbonate resin composition wherein 0.05–5 parts of a fiber-forming fluorine-containing polymer (D) are added to this combination, showed a very much larger flame-retarding effect than the polycarbonate resin alone without any additives (Comparative Example 1), the polycarbonate resin composition not containing both the silicone compound (B) and the alkali metal salt of an aromatic sulfonic acid (C) shown by the general formula 1 (Comparative Examples 2–4, 13–16, 19–23), or silicone compounds having a different structure to that of this invention (Comparative Examples 17–18, 23–26). Further, the reduction of impact strength of the polycarbonate resin composition which was a problem when conventional bromine flame-retarding agents were added as in Comparative Example 5, is remarkably improved as shown in this Example.

If the addition amount of the silicone compound (B) is less than 0.01 parts (Comparative Examples 9–10), flame resistance decreases as shown in Examples 12–18 and Comparative Examples 9–12, and if it is greater than 8 parts (Comparative Examples 11–12), moldability decreases.

If the addition amount of the aromatic sulfonic acid alkali metal salt (C) shown in the general formula 1 is less than 0.01 parts as shown in Examples 4–11 and Comparative Examples 6–8, flame resistance decreases (Comparative Example 6), and if it is larger than 2 parts, moldability and impact hardness decrease (Comparative Examples 7–8).

If, of the aromatic sulfonic acid alkali metal salts (C) shown by the general formula 1, the sodium content of the non-halogen sodium salts is adjusted to 0.001–0.05 parts, as shown in Examples 51–68, they show superior flame-retarding properties.

When the fiber-forming fluorine-containing polymer(D) is used together with the silicone compound (B) and aromatic sulfonic acid alkali metal salt shown by the general formula 1 (C), the drip prevention effect of the polycarbonate resin composition during combustion improves, and there is also a large reduction of combustion time, as shown in Examples 22–28, Examples 29 and 30, 33 and 34, 35 and 36, 37 and 38, 39 and 40, 41 and 42, 43 and 44. The fiber-forming fluorine-containing polymer used together with a non-halogen aromatic sodium sulfonate wherein the sodium content has been adjusted, and the silicone compound (B), not only improves the drip prevention effect of the polycarbonate resin composition but also largely reduces the combustion time, as shown in Examples 51–56 and Examples 57–68. This fluorine-containing polymer (D) not only functions as a simple drip inhibitor. There is also a synergistic effect in improving the overall flame retardancy in a combined system of this silicone compound (B) and this metal salt (C), or this silicone compound (B) and a non-halogen aromatic sulfonic acid sodium salt wherein the sodium content is adjusted. Also, when it was attempted to manufacture a composition wherein 6 parts of this fluorine-containing polymer (D) were added to the combination of Example 22, granulation became difficult, and an evaluation could not be made.

When a branch unit of the main chain, i.e., a unit of formula $RSiO_{1.5}$ (T unit) and/or a unit of formula $SiO_{2.0}$ (Q unit) are included as shown in Examples 29–36 and Comparative Examples 16–18 in the structure of this silicone compound, the flame resistance, moldability and impact strength of the resulting polycarbonate resin composition largely improve as compared with a silicone which does not contain them (Comparative Examples 16–18), and these characteristics are enhanced in substances which contain 20 mol % or more relative to all the siloxane units ($R_{3-0}SiO_{2-0.5}$ (Examples 29–34). Further, in silicone compounds which contain 30 mol % or more of these branch units (Examples 29, 30), flame resistance and impact properties further improve, as is clear from a comparison of Examples 29, 30 and Examples 33, 34. If the amount of these branch units exceeds 95 mol %, an obvious flame-retarding effect may not easily be achieved. Hence, it is preferable that there are at least 20 mol % of the branch units, i.e., the units of formula $RSiO_{1.5}$ (T unit) and/or units of formula $SiO_{2.0}$ (Q unit), relative to all the siloxane units ($R_{3-0}SiO_{2-0.5}$, and a range of 30 mol % to 95 mol % is particularly suitable for flame resistance, moldability and impact strength.

Further, substances including units of formula $SiO_{2.0}$ (Q unit) have the same or higher degree of flame resistance compared with substances comprising only a unit of formula $RSiO_{1.5}$ (T unit) as branch unit, as shown in Examples 30, 31.

In addition, when there are aromatic groups (phenyl groups) in the organic substituents of the silicone compound (B), as shown in Examples 37–42, Examples 43–44 and Comparative Examples 23–26, the flame resistance, moldability and impact strength of the resulting polycarbonate resin composition improve compared with substances which do not contain them (Comparative Example 23–26). When they account for 20 mol % or more (Examples 37–42), flame resistance, moldability and impact strength are further improved, and when they account for 40 mol % or more (Examples 37–40) as shown in Examples 37–40 and Examples 41–42, the flame-retarding effect is greatly enhanced. When the aromatic groups (phenyl groups) in the organic substituents account for more than 95%, an obvious flame-retarding effect may not easily be achieved. Hence, it is preferable that the aromatic groups (phenyl groups) in the organic substituents account for 20 mol % or more, with a range of 40 mol % to 95 mol % being particularly preferred from theviewpoint of flame-retarding properties, moldability and impact strength.

Regarding the terminal groups of silicone compound (B), substances containing methyl groups (Examples 13, 17, 30), phenyl groups (Examples 37–38), hydroxy groups (Examples 20–21) and alkoxy groups (methoxy groups) (Example 32) show good flame resistance, moldability and impact strength, as seen from Examples 13 and 17, 20–21, 30 and 32, 37–38. It is seen that methyl groups confer better flame resistance than hydroxy terminal groups, as shown in Examples 13 and 17, 20 and 21, and that methyl groups confer better flame resistance than alkoxy groups, as shown in Examples 30 and 32. Further, methyl groups confer better flame resistance than phenyl groups. In addition, in substances including epoxy groups (gamma glycidoxypropyl groups) and vinyl groups, reactivity is particularly high, so the silicone compounds react with each other when kneading with the polycarbonate resin, the silicone compound (B) gels, the moldability of the polycarbonate resin largely decreases and dispersibility of the silicone compound (B) in the polycarbonate resin decreases, so sufficient flame-retarding effect and impact strength cannot be obtained. Therefore, as the terminal group of the silicone compound (B), methyl is the most preferable.

Regarding the molecular weight of this silicone compound (B), 5000–500000 is suitable and 10000–270000 is particularly suitable from the viewpoint of moldability and flame resistance, as understood from Example 2, 3, 17, 19. As the aromatic sulfonic acid alkali metal salt shown by the general formula 1 (C), as seen in Examples 45–50, 2,5-dichlorobenzene sodium sulfonate (C-1), 2,4,5-trichlorobenzene sodium sulfonate (C-2) or sodium salt of 2,4,6-tricholoro-5-sulfo isophthalic acid dimethyl (C-3) are suitable, where 2,5-dichlorobenzene sodium sulfonate and 2,4,5-trichlorobenzene sodium sulfonate are particularly preferred. On the other hand, as the non-halogen aromatic sodium sulfonate, as shown in Examples 51–68, p-toluenesulfonic acid sodium (C-4), 1-naphthalenesulfonic acid sodium (C-5), p-sodium styrenesulfonate (C-6), isophthalic acid dimethyl-5-sodium sulfonate (C-7), sodium benzenesulfonate (C-8), 1-naphthalenesulfonic acid sodium (C-9) and m- benzene sodium disulfonate (C-10) are suitable, where p-toluenesulfonic acid sodium and 1-naphthalenesulfonic acid sodium are particularly preferred.

From the above results, it is seen that when 0.1–8 parts of the silicone compound (B) and 0.01–2 parts of the aromatic sulfonic acid alkali metal salt (C) shown in the general formula 1 of this invention are used together, a very large flame-retarding effect on the polycarbonate resin (A) is obtained that cannot be achieved if the silicone compound (B) is used alone. Further, regarding the non-halogen aromatic sodium sulfonate, a highly superior flame resistance effect is achieved by adjusting the sodium content to the range of 0.001–0.05 parts. This is a special synergistic effect found only in a combination of these components. Further, when 0.05–5 parts of the fiber-forming fluorine-containing polymer (D) is used in combination with the above components, not only does the drip prevention effect on the polycarbonate resin during combustion improve, but there is also a large effect in reduction of combustion time, and there is a synergistic effect in improving the overall flame retardance only in the combined system of this silicone compound (B) and this metal salt (C).

The polycarbonate resin composition of this invention possesses superior flame resistance without losing shock resistance and moldability, and as it does not contain halogen fire retardants manufactured from chlorine and bromine compounds, there is no concern about generation of gases containing halogen from the fire retardant during combustion.

What is claimed is:

1. A polyearbonate resin composition comprising, relative to 100 parts by weight of a polycarbonate resin (A), 0.01–8 parts by weight of a silicone compound (B) having a branched chain structure, a weight average molecular weight of 5000–500,000, and organic substituents, wherein at least a portion of the organic substitutients contain aromatic groups, and 0.01–2 parts by weight of an alkali metal salt of an aromatic sulonic acid (C) represented by the general formula:

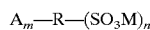

$$A_m\text{—}R\text{—}(SO_3M)_n$$

wherein R is a phenyl or napthyl group, A is a member of the group consisting of a halogen atom, alkyl group, aryl group, vinyl group, alkoxy group, amino group, methyl ester group and ethyl ester group, M is an alkali metal and n is 1 or 2, and provided further that when R is phenyl, m is 0–5 and m+n≦6 and when R is naphthyl, m is 0–7 and m+n≦8.

2. The flame resistant polycarbonate resin composition of claim 1, further comprising 0.5–6 parts by weight of a fiber-forming fluorine-containing polymer (D).

3. The flame resistant polycarbonate resin composition of claim 1, wherein the a amount of the silicone component (B) is 0.1–5 parts by weight, and the amount of the alkali metal salt (C) is 0.1–1 parts by weight, based on 100 parts by weight of the polycarbonate resin.

4. The flame resistant polycarbonate resin composition of claim 2, wherein the amount of the silicone component (B) is 0.1–5 parts by weight, the amount of the alkali metal salt (C) is 0.01–1 part by weight, and the amount of the fluorine-containing polymer (D) is 0.05–1 parts by weight, based on 100 parts by weight of the polycarbonate resin.

5. The flame resistant polycarbonate resin composition of claim 1, wherein the silicone compound (B) contains a unit having the formula RSiO1.5 (T unit), wherein R is an organic group, or a unit having the formula $SiO_2$ (Q unit), or both T and Q units, wherein the T and Q units account for at least 20 mol % of the total siloxane units.

6. The flame resistant polyearbonate resin composition of claim 1 wherein at least 20 mol % of the organic substitutients on the silicone compound (B) are aromatic groups.

7. The flame resistant polycarbonate resin composition of claim 5 wherein said aromatic groups are phenyl groups, and the silicone compound has terminal groups selected from the group consisting of methyl, phenyl and hydroxy, and the remaiig organic substituents are methyl.

8. The flame resistant polycarbonate resin composition of claim 1 wherein said alkali metal salt (C) is selected from the group consisting of alkali metal salts of p-toluenesulfonic acid, p-styrenesulfonic acid, 1-naphthalenesulfonic acid, isophthalic acid, dimethyl-5-sulfonic acid, 2,6-naphthalenedisulfonic acid, benzenesulfonic acid, benzene disulfonic acid, 2,4,6-trichloro-5-sulfo-isophthalic acid, dimethyl-2,5-dichlorobenzene sulfonic acid and 2,4,5-trichlorobenzene sulfonic acid.

9. The flame resistant polycarbonate ream composition of claim 8 wherein said alkali metal salt (C) is selected from the group consisting of sodium 2,4,6-trichloro-5-sulfo-isophthalate, sodium 2,5-dichlorobenzene sulfonate, sodium 2,4,5-trichlorobenzene sulfonate, potassium 2,4,6-trichloro-5-sulfo-isophthalate, potassium 2,5-dichlorobenzene sulfonate and potassium 2,4,5-trichlorobenzene sulfonate.

10. The flame resistant polycarbonate resin composition of claim 8 wherein said alkali metal salt (C) is sodium p-toluene sulfonate, sodium p-styrenesulfonate, sodium 1-naphthalenesulfonate, sodium isophthalate, sodium dimethyl-5-sulfonate, sodium 2,6-naphthalene disulfonate, sodium benzene sulfonate and sodium benzene disulfonate.

11. The flame resistant polycarbonate resin composition of claim 10 wherein the sodium content of said alkali metal salt is 0.001–0.05 parts by weight per 100 parts by weight of the polycarbonate resin (A).

12. The flame resistant polycarbonate resin composition of claim 11 wherein the sodium content of said alkali metal salt is 0.002–0.04 parts by weight per 100 parts by weight of the polycarbonate resin (A).

13. The flame resistant polycarbonate resin composition of claim 2 wherein the fluorine-containing polymer (D) is polytetrafluoroethylene.

14. The flame resistant polycarbonate resin composition of claim 4 wherein the fluorine-containing polymer (D) is polytetrafluoroethylene.

15. A polycarbonate resin composition comprising, relative to 100 parts by weight of a polycarbonate resin (A), 0.01–8 parts by weight of a silicone compound (B) having a branched chain structure and organic substituents, wherein at least a portion of the organic substitutients contain aromatic groups and the remaining organic substituents are methyl, and 0.01–2 parts by weight of an alkali metal salt of an aromatic sulfonic acid (C) represented by the general formula:

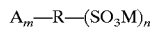

$$A_m-R-(SO_3M)_n$$

wherein R is a phenyl or napthyl group, A is a member of the group consisting of a halogen atom, alkyl group, aryl group, vinyl group, alkoxy group, amino group, methyl ester group and ethyl ester group, M is an alkali metal, and n is 1 or 2, and provided further that when R is phenyl, m is 0–5 and $m+n \leq 6$ and when R is naphthyl, m is 0–7 and $m+n \leq 8$.

16. The flame resistant polycarbonate resin composition of claim 15 wherein the amount of the silicone component (B) is 0.1–5 parts by weight, the amount of the alkali metal salt (C) is 0.01–1 part by weight, and the amount of the fluorine-containing polymer (D) is from 0.06–1 parts by weight, based on 100 parts by weight of the polycarbonate resin.

17. The flame resistant polycarbonate resin composition of claim 15 wherein the silicone compound (B) contains a unit having the formula $RSiO_{1.5}$ T unit), wherein R is an aromatic or method, or a unit having the formula $SiO_2$ (Q unit), or both T and Q units, wherein the T and Q units account for at least 20 mol % of the total siloxane units.

* * * * *